(12) United States Patent
Cai et al.

(10) Patent No.: US 9,745,227 B2
(45) Date of Patent: Aug. 29, 2017

(54) METHOD FOR APPLYING DISCRIMINATING LAYER ONTO POROUS CERAMIC FILTERS

(75) Inventors: Jun Cai, Midland, MI (US); Aleksander J. Pyzik, Midland, MI (US); James J. O'Brien, Midland, MI (US); Robin P. Ziebarth, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 260 days.

(21) Appl. No.: 13/812,515

(22) PCT Filed: Aug. 17, 2011

(86) PCT No.: PCT/US2011/048036
§ 371 (c)(1),
(2), (4) Date: Jan. 27, 2013

(87) PCT Pub. No.: WO2012/030533
PCT Pub. Date: Mar. 8, 2012

(65) Prior Publication Data
US 2013/0149458 A1    Jun. 13, 2013

Related U.S. Application Data

(60) Provisional application No. 61/379,215, filed on Sep. 1, 2010.

(51) Int. Cl.
*C04B 38/00* (2006.01)
*B05D 5/00* (2006.01)
(Continued)

(52) U.S. Cl.
CPC ........... *C04B 38/0038* (2013.01); *B01J 35/04* (2013.01); *B01J 37/0215* (2013.01); *B05D 5/005* (2013.01);
(Continued)

(58) Field of Classification Search
None
See application file for complete search history.

(56) References Cited

U.S. PATENT DOCUMENTS

2005/0207946 A1* 9/2005 Asano ................ B01D 46/0001
                                                        422/177
2006/0210822 A1    9/2006 Ono
(Continued)

FOREIGN PATENT DOCUMENTS

EP      1576998 A        9/2005
EP      1 775 022    *   4/2007
(Continued)

OTHER PUBLICATIONS

Kazuhiro, H., "Phosphor Precursor, Electroluminescent Phosphor, Their Production Methods and Dispersed Electroluminescence Element", JP2006008806, Jan. 12, 2006, Fuji Photo Film Co Ltd.
(Continued)

*Primary Examiner* — Michael P Rodriguez
(74) *Attorney, Agent, or Firm* — The Dobrusin Law Firm, P.C.

(57) ABSTRACT

A porous discriminating layer is formed on a ceramic support having at least one porous wall by (a) establishing a flow of a gas stream containing agglomerates of particles and (b) calcining said deposited layer to form the discriminating layer. At least a portion of the particles are of a sinter-resistant material or a sinter-resistant material precursor. The particles have a size from 0.01 to 5 microns and the agglomerates have a size of from 10 to 200 microns. This method is an inexpensive and effective route to forming a discriminating layer onto the porous wall.

18 Claims, 2 Drawing Sheets

(51) Int. Cl.
*B01J 35/04* (2006.01)
*B01J 37/02* (2006.01)
*C04B 41/00* (2006.01)
*C04B 41/45* (2006.01)
*C04B 41/87* (2006.01)
*B01J 23/10* (2006.01)
*B01J 29/40* (2006.01)
*C04B 111/00* (2006.01)

(52) U.S. Cl.
CPC ........ *C04B 41/009* (2013.01); *C04B 41/4545* (2013.01); *C04B 41/87* (2013.01); *B01J 23/10* (2013.01); *B01J 29/40* (2013.01); *B01J 37/0246* (2013.01); *B05D 2203/30* (2013.01); *C04B 2111/00793* (2013.01)

(56) References Cited

U.S. PATENT DOCUMENTS

| | | |
|---|---|---|
| 2007/0021292 A1 | 1/2007 | Maki et al. |
| 2007/0213207 A1 | 9/2007 | Saha |
| 2008/0069945 A1* | 3/2008 | Horne et al. ............ 427/64 |
| 2008/0293564 A1 | 11/2008 | Saha |
| 2008/0299377 A1* | 12/2008 | Gu ................. B01D 39/2075 428/307.7 |
| 2009/0239030 A1 | 9/2009 | Cai |

FOREIGN PATENT DOCUMENTS

| | | |
|---|---|---|
| EP | 1775022 A | 4/2007 |
| JP | 10-249124 A | 9/1998 |
| JP | 10263340 A | 10/1998 |
| JP | 2006008806 A | 1/2006 |
| JP | 2009026405 A | 2/2009 |
| JP | 2009-085010 A | 4/2009 |
| JP | 2010095399 A | 4/2010 |
| WO | 2008-011167 A | 1/2008 |

OTHER PUBLICATIONS

Hiroshi, S., et al., "Material for Magnetic Head Slider, Magnetic Head Slider, Hard Disk Device, and Manufacturing Method of Material for Magnetic Head Slider", JP2009026405, Jul. 20, 2007, TDK Corp.

Hiroshi, O., et al., "Production of Ceramic Filter Element and Device Therefore", JP-A-H10263340, Oct. 6, 1998, Mitsubishi Heavy Ind Ltd.

Sunao, N., et al., "Coating Material for Forming Porous Film and Porous Film, Ceramic Filter, Exhaust Gas Purifying Filter and Method for Manufacturing Ceramic Filter", JP2010095399, Apr. 30, 2010, Sumitomo Osaka Cement Co Ltd.

* cited by examiner

METHOD FOR APPLYING DISCRIMINATING LAYER ONTO POROUS CERAMIC FILTERS

This application claims priority from U.S. Provisional Patent Application No. 61/379,215, filed 1 Sep. 2010.

The present invention relates to methods for preparing porous ceramic filters and support materials.

Porous ceramic materials are used in many filtering applications and as catalyst supports in a variety of applications. An important use for porous ceramic materials is in treating exhaust gases from combustion processes, including, for example, the exhaust gases from internal combustion engines. Porous ceramic materials are called upon to filter soot particles from the exhaust gases, and in some cases to carry a catalytic material which can catalyze the chemical conversion of certain components of the exhaust (such as $NO_x$ compounds) into benign compounds (such as $N_2$ and $H_2O$).

Various types of ceramic filters are used in these applications, including, for example, acicular mullite, cordierite and silicon carbide, among others.

There are several significant practical problems with these filters.

One problem is that the pores of these filters are often significantly larger than the soot or other particles that they are designed to remove. Soot particles in particular can be 2 orders of magnitude or more smaller than the pores. The small size of the particles allows many of them to pass through the filter instead of being trapped. This problem is particularly acute during early stages of operation, when filter is clean. During continued operation, some of these small particles eventually become trapped in the filter, in effect reducing the pore size as the trapped particles accumulate. As a result, filtration efficiency improves somewhat after the filter has been in use for a while. In some applications, such as automotive exhaust filters, the accumulated soot is burnt out periodically, after which the filter again becomes less efficient until another soot layer has accumulated. Therefore, the problem of reduced efficiency and the escape of soot particles or other particulate pollutants can occur frequently during the lifetime of the filter. It is desirable to provide a filter which can capture very small soot particles and which also exhibits high filtration efficiency during initial stages of operation.

One way to accomplish this is to reduce the size of the pores through the filter walls, but reducing pore size very significantly increases the pressure drop across the filter. The higher pressure drop leads to either higher operating pressures (which increases the burden the filter imposes on upstream apparatus such as an internal combustion engine) or slower gas flow rates through the filter (or both). For this reason, simply reducing the size of the pores through the filter walls is not an adequate solution.

Another approach is to apply a thin discriminating layer to the surface of the filter walls. The applied discriminating layer has smaller pores than the filter walls, and so allows the filter to capture small particles even during initial stages of operation. In principle, this effect can be achieved without an unduly large increase in pressure drop across the filter (compared to that seen with the uncoated filter). This is because the discriminating layer is thin and therefore gases have to traverse only a short distance through the highly constricted small pores of the discriminating layer. Once the gases pass through this discriminating layer, they enter into and pass through the larger pores of the filter walls, through which they can flow more easily and with less pressure drop through the filter.

The usual method for applying such discriminating layers to ceramic filters is through a slurry process. Small particles are dispersed into a liquid to form a slurry which is then passed through the filter. The particles deposit on the filter wall surfaces as they pass through to form a thin coating. This coating is then dried and calcined to produce the discriminating layer. However, since the filter is porous, the slurry will penetrate into filter pores by capillary action to occupy some of the pores of the filter. This blocks the pores and leads to increases in pressure drop, as well as a waste of coating materials. Other problems arise when the coating is dried and calcined. These steps must be performed carefully to avoid cracking and to achieve the needed physical strength. Because the carrier liquid must be removed, these drying and calcining steps tend to be slow, energy intensive and costly. Another problem with this method is that it does not perform well when the filter wall surfaces are highly porous and/or have large pores. In those cases, the pores in the filter wall tend to become plugged due to the infiltration of large numbers of particles through the pores. To make the process work in those cases, one often has to first fill the pores of the wall with a sacrificial material, followed by deposition of the discriminating layer. The sacrificial layer is then burnt off. Another approach is to sequentially deposit several individual layers, one by one, starting with large particles, and then proceeding with smaller and smaller particles. This process often requires heat treatment/calcining between the individual deposition steps. Both of these approaches are quite expensive.

Therefore, a better and more efficient method for forming a discriminating layer onto a ceramic filter is desired.

EP 1 775 022 describes a process for depositing a porous catalyst coating onto a porous support. In the process, an aerosol is formed from a solution of the catalyst or a catalyst precursor. This aerosol is directed through a heating zone, where the solvent is driven off, producing very fine particles of catalyst or catalyst precursor. The air stream containing these particles is then directed through a porous filter, where they deposit onto the surfaces of the filter pores. The filter containing the captured particles is again heated to form a catalyst layer. In the process as described in EP 1 775 022, the catalyst or catalyst precursor materials deposit along the walls of the pores of the filter. This maximizes the surface area of the applied catalyst, which is important in catalytic applications to obtain fast reaction rates. EP 1 775 022 does not describe the formation of a discriminating layer.

Another problem with many ceramic filters is that they are very difficult to produce without small defects. The defects may take several forms, including, for example, small cracks and holes, and, in some cases, defects in the crystal structure of the filter material. These defects can lead to a large number of rejected parts, unless some economical method is provided for repairing the defects.

This invention is in one aspect a method of forming a porous discriminating layer on a ceramic support having at least one porous wall comprising (a) establishing a flow of a gas stream containing particle agglomerates through said at least one porous wall from a gas entry side of said at least one porous wall to a gas outlet side of said at least one porous wall, such that at least a portion of the agglomerates deposit to form a deposited layer of the agglomerates, their constituent particles or both on the gas entry side of said at least one porous wall, wherein (1) at least a portion of the particles that make up the particle agglomerates are of a ceramic material or precursor to a ceramic material, (2) the particles that make up the particle agglomerates have a size from 0.01 to 5 microns (μm), (3) the agglomerates have a size of from 10 to 200 microns and (4) said deposited layer extends only partially through the thickness of said at least one porous wall and (b) calcining said deposited layer to form the discriminating layer.

The process of this aspect of the invention is a very efficient and economical approach to forming a discriminating layer onto a porous filter. In the process, the applied particle agglomerates are captured almost exclusively at the gas entry surface of the porous walls of the filter (or in defects in the walls) to form a very thin (typically no greater than 100 micron thick and preferably not greater than 30-50 microns thick) layer of agglomerates and/or their constituent particles at the gas entry surfaces of the walls. Despite the somewhat large size of the agglomerates, the captured material does not block off the pores in the filter walls and, except at the sites of defects in the filter walls, the agglomerates and/or their constituent particles tend to deposit in at most very small quantities into the internal surfaces of the pores of the support wall(s). Therefore, the pore size of the support walls is largely unchanged except at near or at the surface at which the discriminating layer is applied. Once the calcining step is performed, the deposited particles form a thin, porous discriminating layer, which has a pore size significantly smaller than that of the uncoated support walls. As a result, the filter often has very good filtration efficiency over a wide range of filtrate particle sizes and exhibits good initial filtration efficiency. The filter also produces a pressure drop which in many cases is not significantly greater than that produced by the uncoated support under the same operating conditions.

Another advantage of the invention is that the discriminating layer can be applied to only one side of the porous wall(s) of the support, if desired. This leaves the other side of the wall(s) available for deposition of a catalytic material or other functional material, if desired. Because no discriminating layer is applied to the other side of the wall in these embodiments, it remains possible to subsequently deposit a catalytic or other functional material onto the surface of the other side, or even into the pores of the porous wall, after the discriminating layer has been applied.

Yet another advantage of the invention, in some embodiments, is that the calcining step can be performed simultaneously with some other heat treatment step that is needed in the preparation of the underlying support and/or the finished part. For example, the calcining step may be conducted at the same time as a burn-out or other finishing heating step that is conducted on the support. An example of such a step is a final heat treatment step to remove residual fluorine from an acicular mullite support. The calcining step also can be performed at the same time as a skin or channel cap materials are fired. The ability to combine these heat treatment steps means that the calcining step may in many cases be performed at little or no incremental cost.

This invention is also a method of repairing a defect in a ceramic support having at least one porous wall having pores and at least one defect resulting in an opening in said porous wall, said opening being large relative to the pores, comprising (a) establishing a flow of a gas stream containing particle agglomerates though the support and through said defect in the porous wall from a gas entry side of said porous wall to a gas outlet side of said at least one porous wall, such that the agglomerates, their constituent particles or both become lodged within said defect in said at least one porous wall to at least partially close the defect, wherein (1) at least a portion of the particles that make up the agglomerates are of a ceramic material or a precursor to a material, (2) the particles that make up the agglomerates have a size from 0.01 to 5 microns and (3) the agglomerates have a size of from 10 to 200 microns, and (b) calcining said lodged agglomerates or particles.

The filter product may be used in any applications requiring resistance to hot gases or liquids such as heat exchangers, catalyst supports and filters (for example, molten metal and soot filters).

Figure 1:
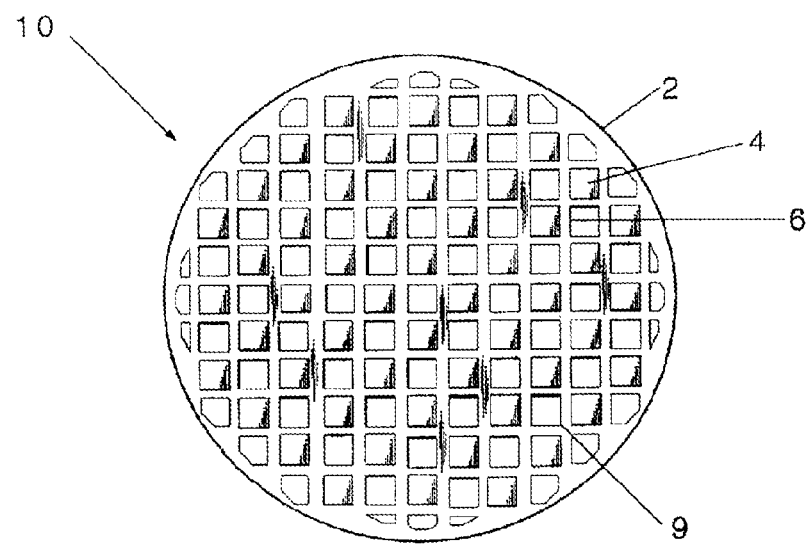
FIG. 1 is a top view of a honeycomb filter of the type useful as a starting material for the process of the invention.

Turning to FIG. 1, there is shown an embodiment of a ceramic support as is typically used in filtering and catalyst support applications. Support 10 includes peripheral wall 2 and a series of intersecting walls 6 which define axially-extending cells 4. As shown in more detail in FIG. 2, cells 4 in this particular embodiment are of two types, namely inlet cells 4A and outlet cells 4B. The inlet cells 4A and outlet cells 4B are arranged in alternating fashion in the support. Inlet cells 4A are plugged at an outlet end (indicated by arrow 11) of support 10 with plugs 8. Outlet cells 4B are plugged at an inlet end (indicated by arrow 12) of support 10 with plugs 9. During operation, a gas to be treated is introduced into cells 4A at inlet end 12 of support 10. Walls 6 are porous, which allows the gas to permeate through walls 6 into outlet cells 4B and from there out of outlet end 11 of support 10. Particulates in the gas stream are captured by porous walls 6, which operate as the active filter. Walls 6 may hold a catalytic material, which catalyzes a reaction of one or more components of the gas stream. Walls 6 each have an inlet side 5, each of which faces an inlet cell 4A, and an outlet side 7, each of which faces an outlet cell 4B. As used herein, "inlet" refers to the end of the support into which gases are to be introduced during the intended end-use of the filter, and "outlet" refers to the end of the support from which gases are removed during the intended end-use of the filter. Note that the "inlet" and "outlet" designations apply to the end-use of the filter, and not necessarily to the direction of gas flow during the deposition of the discriminating layer.

The pore size of walls 6 may vary considerably, depending on the particular application for which support 10 is designed. "Pore size" is expressed for purposes of this invention as an apparent volume average pore diameter as measured by mercury porosimetry (which assumes cylindrical pores). In some embodiments, the pore size of walls 6 is from about 1 to 100 microns. For filtering combustion exhaust gases, a more typical pore size is from 5 to 50 microns, more typically from about 10 to 50 microns or from 15 to 35 microns.

The thickness of walls 6 again can vary considerably, but is typically at least 100 microns and more typically at least 200 microns or at least 400 microns. Walls 6 may be up to 5 cm thick or thicker in some embodiments, up to 5 mm thick in other embodiments or up to 400 microns thick in still other embodiments. The porosity of walls 6 may be as low as 5 volume-% or as high as about 90 volume-%. A preferred porosity is at least 25 volume-%, a more preferred porosity is at least 40 volume-% and a still more preferred porosity is at least 65 volume-%. Porosity can be measured by various immersion or mercury porosimetry methods.

The method of the invention is especially useful for applying a discriminating layer to, or fixing defects in, supports which have large pores and/or high porosities. It is difficult, using slurry methods, to apply a discriminating layer in such supports without filling the pores with particles and plugging them or creating large pressure drops during operation. Therefore, a support of particular interest is one in which the volume average pore diameter of the wall(s) is at least 10 microns and especially at least 15 microns, up to 50 microns, up to 35 microns or up to 25 microns. Another support of interest is one in which walls(s) have a porosity of at least 50%, more preferably at least 60%. Supports which have both the porosity and pore sizes just mentioned are of particular interest.

A discriminating layer is applied to at least one wall 6 of support 10 by passing a gas carrying agglomerated particles through such wall.

Figure 2:
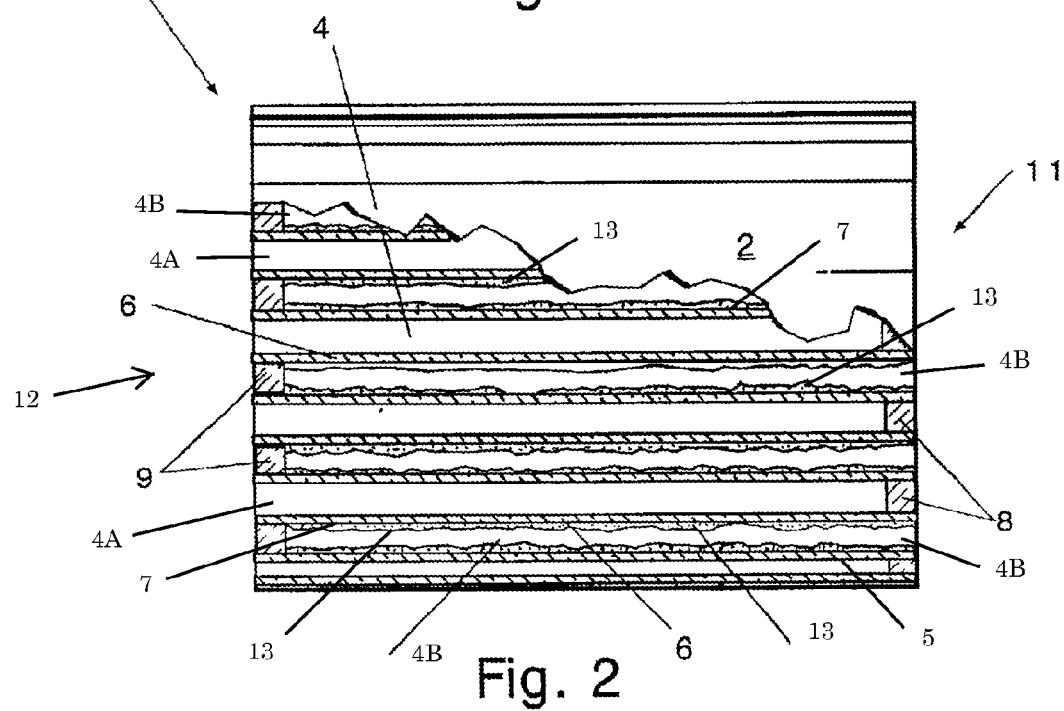
FIG. 2 is a side view, partially in section, of the honeycomb filter having a discriminating layer applied in accordance with the invention.

In the inventive process, a discriminating layer (indicated by reference numerals 13 in FIG. 2) is applied to one or more walls 6 of support 10. A gas stream containing entrained particle agglomerates is established through at least one wall 6. In the support embodiment shown in FIG. 1 and other honeycomb structures, this is easily accomplished by introducing the gas stream into outlet end 11 of one or more outlet cells 4B and allowing the gas to permeate through one or more walls 6 to adjacent inlet cells 4A and from there out of support 10. In this case, the agglomerates or their constituent particles (or some of both) will deposit mainly onto outlet side 7 of at least one wall 6 to form layer 13 as shown in FIG. 2. However, the process can be performed equally well with the gas stream flowing in the opposite direction, into inlet end 12 of inlet cells 4A, through one or more walls 6 into adjacent outlet cells 4B and then out of outlet end 11 of outlet cells 4B. In the latter case, the agglomerates and/or their constituent particles will deposit mainly on inlet side 5 of at least one wall 6 to form a layer. Typically, the agglomerates and/or constituent particles will deposit on all walls 6 that border a cell into which the gas stream is introduced.

The flow of the gas stream can be produced by drawing a vacuum on the side of the support from which the gas is removed (the "gas exit" side), and/or by applying pressure to the side of the support into which the gas is introduced (the "gas entry" side). In the embodiment shown in FIG. 2, the "gas entry" side corresponds to outlet side 7 of walls 6.

The gas stream contains entrained agglomerated particles of a ceramic material or a precursor to a ceramic material. The particle agglomerates can be distributed into the gas stream in any convenient manner, such as, for example, by flowing the gas through a bed of the particle agglomerates, by spraying the particle agglomerates into a moving gas stream, or other useful approach. In one convenient approach, the particle agglomerates are deposited onto a screen and the screen is positioned at or near the end of the support into which the particle agglomerates are to be introduced. The gas stream is then passed through the particle agglomerates, through the screen and then through the support. In this embodiment, the gas stream is preferably produced by drawing a vacuum through the support.

The particle agglomerates are assemblages of smaller particles. The binding forces the hold the particles together to form the agglomerates are not considered to be critical, and can include, for example, electrostatic forces, cohesion between the particles, adhesion of the particles by some binder or other adhesive, and the like. The particles preferably are only weakly bound together to form the agglomerates; agglomerates in which the particles are bound by electrostatic forces and/or which are prepared in a spray-drying process as described below are especially suitable.

At least some of the particles which form the agglomerates are particles of a ceramic material or of one or more precursors to a ceramic material. Examples of ceramic materials that are useful in this invention include, for example, mullite, cordierite, perovskites, titanium oxide, zinc oxide, zeolites, alumina, zirconia, silica, boron nitride, silicon nitride, boron carbide, silicon carbide, tungsten carbide, aluminum nitride, silicon oxynitride, silicon carbonitride, beta spodumene, aluminum titanate, strontium aluminum silicates, lithium aluminum silicates and the like.

Precursors of ceramic materials are one or more materials that react under the conditions of the calcining step to form a ceramic material. An example of a precursor is a mixture of aluminate and silicate materials, which can produce mullite during the calcining step.

It is preferred that at least 50% or at least 75% by weight of the particles are of a ceramic material or precursor to a ceramic material. All of the particles may be of a sinter-resistant material or precursor to a sinter-resistant material.

In some embodiments, the particles are of the same material as the support, or precursors thereto, or else have a coefficient of thermal expansion (±1 ppm/° C.) that is the same as or nearly the same as that of the support. Thus, for example, agglomerated particles of mullite or mullite precursors may be deposited into an acicular mullite support. The use of the same materials for the particle and the support, or of materials having closely similar coefficients of thermal expansion, often tend to lead to discriminating layers that exhibit less cracking and/or delamination from the support during thermal cycling.

Agglomerates of two or more types of particles can be used. For example, particle agglomerates of two or more ceramic materials, or of precursors to two or more ceramic materials, can be deposited. Porogen particles can be mixed with the particles of the ceramic material(s) or ceramic material precursor(s). Porogen particles can be agglomerated with themselves, with particles of the ceramic material and/or precursor, or both. The porogen particles are useful for creating voids in the applied layer. Typically, these porogens are materials that decompose, evaporate or in some way volatilize away during the calcining step or other heating step to leave a void. Examples include corn starch, flour, wood flour, carbon particulates (amorphous or graphitic), nut shell flour or combinations thereof.

Particle agglomerates may also include a binder. The binder is in general an organic material that assists the particles to adhere to each other or to the support temporarily until the calcining step is performed. Binders include a variety of organic polymers, of which cellulose ethers are of significance.

The agglomerates may in some embodiments include particles of one or more functional materials, such as catalysts or catalyst precursors. In such a case, the applied discriminating layer then can perform some specialized function, such as catalysis. If these functional particles are the only particles that form the agglomerates, they must also be a ceramic material or a precursor to a ceramic material. If functional particles are used in combination with other ceramic particles (or precursors) to form the agglomerates, then it may not be necessary for the particles of the functional material to be themselves ceramic materials or precursors to a ceramic material. A catalyst precursor preferably is one that is converted to an active catalyst through the calcining step. Examples of such catalysts include, for example, platinum, gold, palladium, ruthenium, cerium oxide, rare earth metals and alkaline metal oxides. In some embodiments, a non-functional discriminating layer is applied to one side of the porous wall(s) 6, and a functional layer is applied to the opposing side of the porous wall. Either or both of these layers can be applied in accordance with the invention. In other embodiments, a layer containing a functional material is applied to both sides of the porous wall(s) in accordance with the invention.

The particle agglomerates have a size of from 10 to 200 microns. Particle and agglomerate sizes, for purposes of this invention, is a volume average particle size as measured by screening or other size-appropriate size classification methods. The agglomerate size is preferably from 10 to 100 microns and more preferably from 15 to 100 microns. The particles that make up the agglomerates suitably have a size which is from 0.01 to 0.1 times the diameter of the pores of the support wall(s). In absolute terms, the particles can have a size from 0.01 to 5 microns, preferably from 0.05 to 1 micron.

The agglomerates can be prepared from their constituent particles using several methods. Very fine primary particles naturally tend to agglomerate somewhat due to simple electrostatic forces. Such electrostatically-agglomerated particles can be formed, for example, by simple tumbling or other light agitation of the particles. Another useful agglomeration method is to suspend the material into a liquid without dissolving the particles, and then spraying the resulting suspension to remove the liquid. The liquid may be water or some other non-solvent for the particles. The liquid may be a mixture of two or more fluids, and may contain a binder as described below. When the suspension is sprayed, droplets that contain multiple particles are formed. When the liquid is removed, typically by evaporation due to the large surface area of the droplets, the particles contained in each droplet tend to be weakly bonded into agglomerates. The bonding of the particles is believed to be due mainly to electrostatic forces, although a binder, if present, also can provide some adhesion between particles.

The particles can be mixed with a binder to agglomerate them, using a spray-drying method as just described or other suitable mixing technique. Other methods, including light calcining methods, may also be of use. Agglomerates can be screened if necessary to remove larger agglomerates, fines and/or unagglomerated primary particles. However, some quantity of smaller particles (less than 10 microns) may be present with the agglomerated particles. In such a case, it is preferred that the smaller particles constitute no more than 25 volume percent, preferably no more than 10 volume percent, of the material that is entrained in the gas and swept into the support.

The agglomerates are preferably only weakly bound together, such that the agglomerates can at least partially break apart upon impact with the wall(s) of the support. The agglomerates should be bound together strongly enough that the agglomerates do not break apart significantly while being transported in the gas stream. Agglomerates which are held together mainly by electrostatic forces, and those formed in the "spray-drying" method described before, usually are made up of particles that are weakly bonded to each other in this manner.

The agglomerates are entrained into a gas which flows through the support. Gas flow rates are high enough that the agglomerates become entrained in the gas and remain entrained in the gas until the gas stream makes contact with the porous wall(s) 6 and the agglomerates and/or their constituent particles deposit on the surface of the gas entry side of the wall. If the gas flow rate is too small, the agglomerates will not become well entrained or will fall out of the gas stream and cause an uneven or defective layer to form. Gas flow rates greatly in excess of that needed to entrain and carry the agglomerates are generally not necessary or beneficial, and can be detrimental in several respects. Excessively high gas flow rates increase operating pressures, which increases cost and may damage the support, and in addition high gas flow rates can force the agglomerates and/or their constituent particles well into the pores of walls 6 (or even through the walls). In the last case, the pressure drop through the resulting filter can become be quite high, defeating the purpose of introducing a discriminating layer. Pressure drops during the deposition process will generally need to be established empirically for a particular support and particular agglomerates.

The agglomerates carried into the support by the gas stream, or their constituent particles, become deposited onto the gas-entry side of one or more porous walls 6. During initial stages of operation, the gas stream will tend to flow towards and through areas of the support where the pressure drop is lowest. These areas are typically areas where there are larger openings in one or more porous walls 6. These larger openings may exist due to, for example, the presence of unusually large pores, defects in the crystal structures (as in acicular mullite supports, for example), or cracks or other defects in the part. Accordingly, agglomerates and/or their constituent particles will tend to deposit more into those regions of porous wall 6 than in areas that have no defects and/or smaller pores and therefore produce higher pressure drops. In initial stages of operation, therefore, the agglomerates and/or constituent particles will tend to become lodged into larger openings and fill those openings, until such time as the pressure drop through such opening(s) becomes approximately equilibrated with the pressure drop through the remainder of the porous wall. After the calcining step is performed, the lodged agglomerates and/or constituent particles form a "patch" in the large opening, and in effect constitute a repair of large openings and/or defects in the support.

If it is desired only to repair defects and/or partially close off large openings in the pore structure of porous wall 6, the flow of the agglomerate-laden gas stream can be discontinued at this point. Once larger openings have been filled, and the pressure drop becomes more uniform, further introduction of agglomerates then leads to the formation of a thin layer of agglomerates and/or their constituent particles over more or less the entire surface of the gas-entry side of porous walls 6. The flow of the agglomerate-laden gas may be continued for any arbitrary length of time, to build up a layer of agglomerates and/or constituent particles of any desired thickness.

Because of their size, the agglomerates are unable to penetrate deeply into the pores of the support walls, and so deposit (as agglomerates and/or their constituent particles) mainly as a thin film 13 on the gas entry side 5 of the porous wall(s) 6 of the support. For application of a discriminating layer, a suitable thickness of the deposited layer is at least 1 micron and preferably at least 10 microns or at least 20 microns. The layer may be as thick as about 500 microns, but preferably is no thicker than about 200 microns and more preferably no thicker than about 100 microns. An especially useful layer thickness is from 25 to 75 microns, or from 25 to 60 microns.

Figure 3:
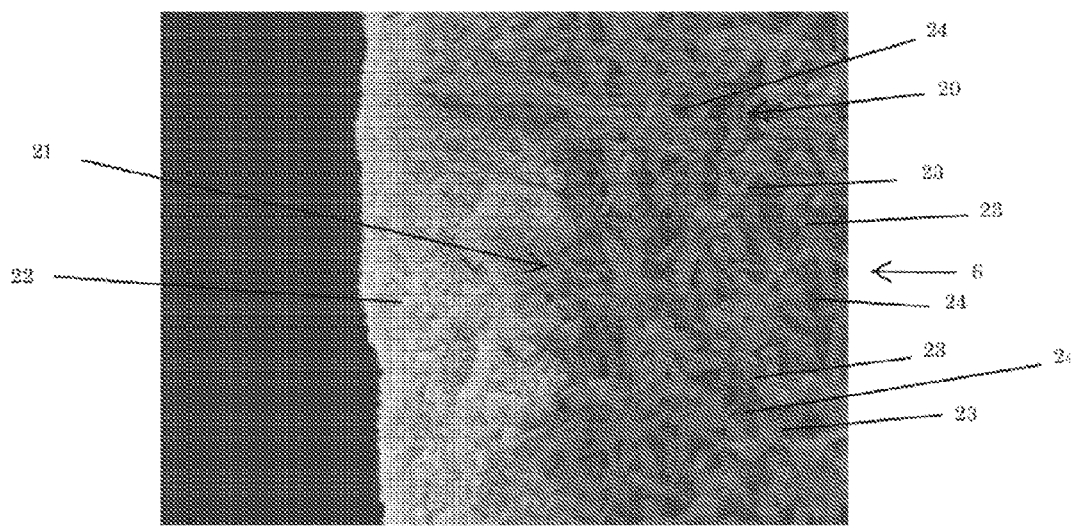
FIG. 3 is a micrograph showing, in a cross-sectional view, a porous support wall having a layer of particles deposited thereon in accordance with the invention.

The deposited layer forms mainly at the gas-entry surface of the support, as shown in FIG. 3. In FIG. 3, a section of a porous wall 6 is made up of a porous ceramic 20 than is, in the embodiment shown, made up of intersecting needles 23. The gas inlet side is indicated by arrow 21. Layer 22 of deposited agglomerates and/or their constituent particles is deposited onto the gas inlet side of porous wall 6. Little or no deposition occurs within pores 24, except along gas inlet side 21.

In preferred embodiments, at least some of the agglomerates break apart upon impacting a support wall, partially or fully dividing back into the individual particles. This phenomenon is illustrated in FIG. 3, where the deposited layer contains primarily constituent particles, rather than agglomerates. It has been found that the agglomerates, especially weakly bound agglomerates such as those held together electrostatically and/or which are prepared in the spray drying process described above, tend to at least partially break apart upon contacting the porous wall(s) 6 of the support, in that manner forming a deposited layer containing mainly constituent particles rather than agglomerates.

As the agglomerates and/or constituent particles deposit onto the gas inlet side of porous wall 6, the flow path of the gas into the pores of wall 6 becomes more restricted, and pressure drop through the support increases. The pressure drop continues to increase with increasing thickness of the deposited layer. The pressure drop correlates to the size of the openings of the pores in the applied layer at the gas entry side of porous walls 6 and to the thickness of the applied layer. Therefore, this pressure drop increase can be used as a process control parameter in manufacturing settings. Correlations between pressure drop increases and the thickness of the deposited layer can be determined empirically for any particular support and particular agglomerates. This correlation can establish a pressure drop that corresponds to any arbitrarily selected target layer thickness. The pressure drop through the support can be measured as the agglomerates and/or constituent particles become deposited, and the particle infiltration process can be continued until a predetermined pressure drop is obtained that correlates to a target layer thickness, at which time the process is terminated.

Other process control methods include, for example, monitoring the weight gain by the support, controlling the treatment time (together with gas flow rates and loading of entrained agglomerates in the gas stream), and the like.

The process can be repeated, if desired, by reversing the direction of the flow of the agglomerate-laden gas, to deposit particles on the opposite side of the porous wall(s) 6. If the deposition process is applied to both sides in this manner, the composition of the layers that are applied to the opposing sides of porous wall 6 do not have to be the same, although they may be.

The deposition step can be carried out at any convenient temperature below the melting or degradation temperature of the deposited material. It is usually unnecessary to heat the support, the particle agglomerates or the gas, and an advantage of this invention is that in most cases the deposition step can be performed at ambient temperature, such as from 0 to 40° C.

The deposited agglomerates and/or constituent particles are then calcined, by which it is meant that heat is applied to the deposited agglomerates and/or particles such that they form a coherent porous mass without melting. The calcining temperature will of course depend on the particular material (s) that are deposited and the particular support. The temperature is high enough that the deposited agglomerates and/or particles become bonded to each other and preferably to the substrate, without melting the particles or significantly densifying the applied discriminating layer. If the deposited agglomerates or particles include ceramic precursors, or precursors to a functional material, the calcining temperature is high enough that those precursor(s) become converted to the corresponding ceramic and/or functional material, as the case may be. The temperature should be high enough to burn out any porogen or binder as may be used. Temperatures should be low enough that the support does not thermally degrade or become distorted. In general, a calcining temperature of from 600° C. to 2000° C. may be used, although specific combinations of deposited material (s) and support may require that more specific and narrower temperature ranges be used. A preferred calcining temperature is at least 800° C. but not higher than 1800° C. In some particular cases, a suitable calcining temperature is at least 1200° C. up to about 1750° C.

The calcining step is continued for a long enough time to accomplish the desired bonding of the deposited agglomerates and/or particles to form a porous mass, without significantly densifying them. In the case in which the deposited material includes a ceramic precursor or a precursor to a functional material, the calcining step is continued for a period long enough to convert the precursor(s) to the corresponding ceramic or functional material, and to form a porous mass that includes the newly-formed ceramic or functional material. For example, mullite precursor(s) in the deposited layer are believed to react to form mullite particles, which then bond together via grain growth mechanisms at the points of contact between adjacent particles. This mechanism is believed to contribute to the very high porosities that are sometimes seen when mullite precursors form all or part of the deposited layer in this process.

In some cases, the calcining step may be performed simultaneously with some other heat treatment step that is needed in the preparation of the underlying filter and/or the finished part.

During the calcining step, the deposited layer forms a coherent, porous mass that is adherent to the support. A small amount of grain growth is believed to occur between adjacent particles during the calcining step, and between the deposited particles and the support, which leads to the formation of necking or bridging between the particles or between the particles and the substrate. In addition, the formation of a ceramic material from ceramic precursors may also contribute to the formation of a coherent mass from the deposited particles, in some cases. The thickness of the resulting coherent, porous mass is approximately that of the deposited layer before the calcining step is performed, and is preferably within the ranges mentioned above with respect to the thickness of the deposited layer. There may be thicker portions, particularly at the site of defects or other larger openings in the support. If the calcined material is to function as a discriminating layer, it should form a substantially continuous layer over the surface of the porous wall, on the gas entry side. At least 70, preferably at least 90% of the surface area of gas entry side of the porous wall(s) may be covered with the calcined layer.

Figure 4:
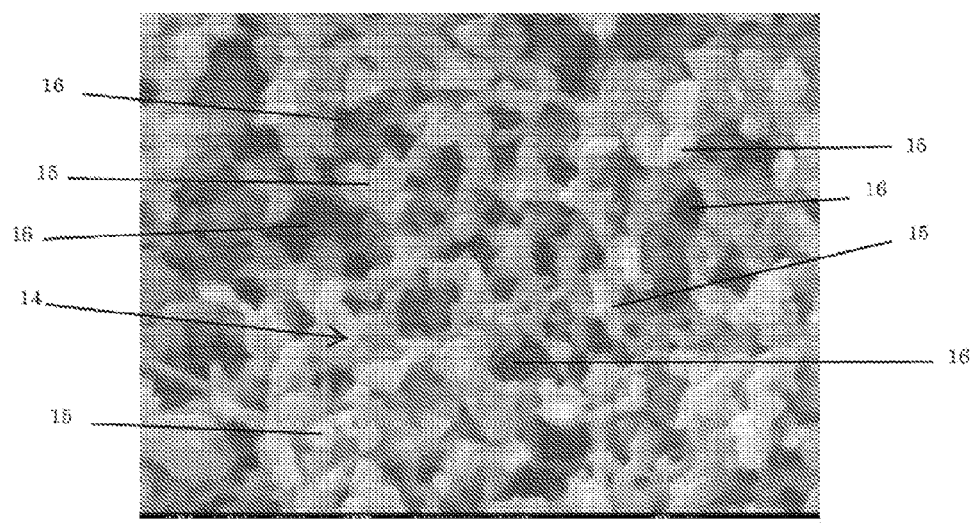
FIG. 4 is a micrograph showing, in a top view, a porous discriminating layer that is formed in accordance with the invention.

The calcined layer is porous. The pores of the calcined discriminating layer are typically smaller than those of the support. The pore size may be from 0.05 to 5 microns. A preferred pore size is 0.1 to 3 microns. The porosity of the calcined particle layer is preferably at least 25%, more preferably at least 40%, and may be as high as 90%. The porosity of the applied discriminating layer can be seen in FIG. 4, in which particles 15 are seen to have become fused into a coherent mass 14 which contains pores 16.

The support may be constructed of any ceramic material which can be made into a porous structure and which can withstand the temperatures encountered when the particles are calcined. Exemplary supports include acicular mullite, alumina, zirconia, silicon carbide, silicon nitride and aluminum nitride, silicon oxynitride and silicon carbonitride, mullite, cordierite, beta spodumene, aluminum titanate, strontium aluminum silicates and lithium aluminum silicate supports. Preferred supports are made of silicon carbide, cordierite, acicular mullite or combinations thereof. Examples of such acicular mullite ceramic bodies that are useful as the support include those described by U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773. The silicon carbide is preferably one as described in U.S. Pat. No. 6,669,751B1, EP1142619A1 or WO 2002/070106A1. Other suitable supports are described by U.S. Pat. No. 4,652,286; U.S. Pat. No. 5,322,537; WO 2004/011386A1; WO 2004/011124A1; US 2004/0020359A1 and WO 2003/051488A1.

The support for many applications preferably has a honeycomb structure, in which multiple porous walls 6 define multiple coaxially aligned cells which, except for end-plugs, extend through the body from an inlet end to outlet end. In such a honeycomb structure, inlet cells and outlet cells alternate so that each inlet cell is surrounded by outlet cells, and vice versa. The cross-sectional shape of the individual cells may be square (as shown in FIG. 1), triangular, rhombic, rectangular, pentagonal, hexagonal, octagonal, or any other convenient shape. It is not necessary that all cells are the same size or the same shape. It is also not necessary to have a periodic array of the cells.

The support may be unitary, or made up of two or more segments which are cemented together or otherwise affixed together.

In particular embodiments, at least some of the cells of a honeycomb support structure having multiple axial cells are plugged at an inlet end or an outlet end, with a cement or other plugging material which requires firing. Optionally a skin may applied to the peripheral surface of the honeycomb, the skin also including a cement or other skinning material which requires heat treatment. The particles are then deposited onto one or more walls of the cells as described before, and the resulting coated support is then heat treated, to simultaneously fire the plugs and/or skin and calcine the deposited layer. In these embodiments, it becomes unnecessary to perform a separate step to calcine the deposited layer.

In other particular embodiments, the support is an acicular mullite which contains residual fluorine from a mullitization reaction. Such a support may have a honeycomb structure, and may contain cells that are plugged with a cement or other plugging material that needs firing, or may have an applied skin which requires heat treatment. A layer is deposited into the acicular mullite support, and the assembly is then heat treated at a temperature sufficient to remove residual fluorine from the acicular mullite support. The deposited layer is calcined during this heat treatment step, and any plug and/or skin material that is present is also fired at the same time. Again, no separate calcining step is needed in these embodiments.

In an embodiment of particular interest, the support is an acicular mullite and the deposited particles and/or agglomerates are mullite precursors which, upon completion of the calcining step, form mullite. The deposited mullite has the same or very nearly the same coefficient of thermal expansion as the underlying acicular mullite support, which can significantly reduce cracking or breakage of the deposited layer during thermal cycling that occurs during the use of the product.

Filters provided with a discriminating layer in accordance with the invention usually, unless a very thick layer is applied, exhibit a pressure drop that is increased only incrementally from that of the uncoated support. Pressure drop increases of 100% or less from that of the untreated support are common; in many cases, the pressure drop increase is no greater than 50%, no greater than 20% and in some cases no more than 10% or even no more than 5%.

Mullite discriminating layers formed in accordance with the invention have been seen to create only very small increases in pressure drop across the filter. As can be seen in the following examples, significant pressure drop increases are often seen after mullite precursor agglomerates are deposited onto a support. However, after the deposited layer is calcined, the pressure drops through the filter are seen to become smaller, often approximating the pressure drops that are exhibited by the uncoated filter. The porosity and/or pore size of the deposited layer appears in this case to increase as a result of the calcining step, possibly in connection with the conversion of the precursors into mullite.

The discriminating layer also provides the filter with a higher filtration efficiency during initial stages of operation, compared to the uncoated support.

Products of the inventions are useful in a wide range of filtering applications, particularly those involving high temperature operation and/or operation in highly corrosive and/or reactive environments in which organic filters may not be suitable. One use for the filters is in combustion exhaust gas filtration applications, including diesel filter and other vehicular exhaust filters.

The products of the invention are also useful as catalyst supports for use in a wide variety of chemical processes and/or gas treatment processes. In these catalyst supports applications, the support carries one or more catalyst materials. The catalyst material may be contained in (or constitute) one or more discriminating layers that are applied in accordance with the invention. The catalyst material may be contained in or constitute another layer, which may be applied under or on top of a discriminating layer applied according to the invention. The catalyst material may be contained within the pore structure of the porous wall(s) 6. The catalyst material may be applied to the opposite side of a porous wall to that on which the discriminating layer resides. A catalyst material may be applied onto the support in any convenient method.

The catalyst may be a platinum, palladium or other metal catalyst that catalyzed the chemical conversion of $NO_x$ compounds as are often found in combustion exhaust gases into benign compounds, e.g., $N_2$ and $H_2O$. In some embodiments, a product of this invention is useful as a combined soot filter and catalytic converter, simultaneously removing soot particles and catalyzing the chemical conversion of $NO_x$ compounds from a combustion exhaust gas stream, such as a diesel engine exhaust stream.

The following examples are provided to illustrate the invention, but are not intended to limit the scope thereof. All parts and percentages are by weight unless otherwise indicated.

EXAMPLE 1

25.35 parts of ball milled clay, 46.4 parts of alumina powder, 25.35 parts of kaolin powder, 0.3 parts of iron oxide and 2.6 parts of raw talc are mixed to form a uniform powder mixture. This mixture is dispersed in water, mixed and spray dried to produce a mullite precursor powder with a volume average particle size of 2-3 microns and lightly agglomerated masses that have a size of from 25 to 100 microns. This powder precursor is poured onto a 45 micron screen and distributed over the screen to form a 1-2 mm thick layer.

A 1.90 cm×1.90 cm×7.6 cm as-mullitized acicular mullite honeycomb (cell size, 31/cm² of honeycomb cross-sectional area) with fresh plugs in alternating cells is wrapped with a tape on the peripheral skin to prevent vacuum leakage. One end is connected to a vacuum source. The open end of the honeycomb is positioned under the 325 mesh (45 micron) screen, and a vacuum is applied through the honeycomb and the screen, sucking agglomerates through the screen and into the honeycomb. The vacuum is continued until about 12 g/L of the aggregates are loaded onto the support. SEM images of the loaded honeycomb show that the loaded material is mainly in the form of the particles that constituted the agglomerates; the particles reside mostly on the surfaces of the gas entry side of the porous walls of the honeycomb.

The loaded honeycomb is then calcined at 1400° C. for 6 hours. During the calcining step, residual fluorine is removed from the acicular mullite honeycomb, the plugs are fired, and the deposited mullite precursor reacts to from a porous mullite discriminating layer (as confirmed by X-ray diffraction) on about 50% of the gas entry surfaces of the porous walls of the honeycomb. The discriminating layer has a thickness of about 10 microns, by SEM.

The pressure drop through the starting honeycomb is measured on a 3051 Pressure Transmitter (Rosemount Inc.) at a flow rate of 100 L/minute, again after the deposition step and a third time after the calcining step. The pressure drop increases 33% after the deposition step is completed, but after the calcining step the pressure drop in the final product is only 3% greater than that of the starting honeycomb.

EXAMPLE 2

Example 1 is repeated, except that this time the loading of the deposited layer is 27 g/L. The thickness of the calcined discriminating layer in this case is about 30 microns and essentially the entire gas entry surface of the pores of the honeycomb is coated. After calcining, the product exhibits a pressure drop of only 9% greater than that of the untreated starting honeycomb.

EXAMPLE 3

Example 1 is repeated again, except that this time the loading of the deposited layer is 46 g/L. The calcined discriminating layer is about 60 microns thick and essentially the entire gas entry surfaces of the pores of the honeycomb are coated. After firing, the product exhibits a pressure drop of only 23% greater than that of the untreated starting honeycomb.

EXAMPLE 4

Example 1 is again repeated, except this time the substrate is a silicon carbide honeycomb with 42% porosity. The loading of the deposited layer is 31 g/L. The loaded honeycomb is calcined as in Example 1.

A 10 micron porous discriminating layer is formed, covering essentially the entire surface of the gas entry side of the walls of the silicon carbide honeycomb. The pressure drop of the final product is 45% higher than that of the starting honeycomb.

EXAMPLE 5

Example 1 is again repeated, except this time the substrate is a 12 cell by 12 cell silicon carbide honeycomb (46 cells/cm²) with 42% porosity. The loading of the deposited layer is 38 g/L. The loaded honeycomb is calcined as in Example 1.

A 20 micron porous discriminating layer is formed, covering essentially the entire gas entry side of the walls of the silicon carbide honeycomb. The pressure drop of the final product is 31% higher than that of the starting honeycomb.

EXAMPLE 6

Using the general procedure described in Example 1, alumina powder having a particle size of about 2-3 microns is formed into 25-100 micron agglomerates. The agglomerates are loaded onto a 1.90 cm×1.90 cm×7.6 cm as-mullitized acicular mullite honeycomb (cell size, 31/cm²) with fresh plugs in alternating cells. About 50 g/L of deposited layer is introduced into the honeycomb. The loaded honeycomb is calcined as in Example 1 to produce a discriminating layer about 20 microns thick. The pressure drop through this filter is about 25% higher than that of the starting honeycomb.

EXAMPLES 7-10

Four additional coated filters are prepared in the general manner described in Example 1. The honeycomb used in these examples is an acicular mullite honeycomb similar to that described in Example 1, with a wall thickness of 265 microns and a pore size of 15 microns.

The loadings for Examples 7-10 are, 17, 26, 27 and 44 g/L, respectively. The agglomerate-laden honeycombs are calcined as described in Example 1. The resulting discriminating layers are about 10, 30, 30 and 50 microns in thickness for Examples 7, 8, 9 and 10, respectively.

The filtration efficiency of each of Examples 7-10 is measured using a scanning mobility particle size (SMPS) analyzer. Total filtration efficiency is measured across the entire particle size range of the test sample, from 10 nm to over 10 microns. Size specific filtration efficiency is measured only across the particle size range of 10 nm to 2.5 microns. Results are as indicated in Table 1.

TABLE 1

| Example No. | Total Filtration Efficiency, % | Size Specific Filtration Efficiency, % |
|---|---|---|
| 7 | 97.9 | 90.4 |
| 8 | 98.5 | 95.5 |
| 9 | 98.7 | 96.2 |
| 10 | 99.3 | 96.8 |

As can be seen from the data in Table 1, even a 10 micron discriminating layer provides excellent total filtration efficiency. Thickening the discriminating layer provides a small incremental benefit in total filtration efficiency. For particles 2.5 microns and smaller, the 10 micron discriminating layer of Example 7 performs slightly less well than do the others, indicating that a somewhat thicker discriminating layer is preferable for filtering particles mainly smaller than 2.5 microns.

The efficiency values in Table 1 represent initial filtration efficiencies. As can be seen, the invention provides for very high filtration efficiencies across a wide range of particle sizes.

EXAMPLES 11-14

Four additional samples are made as described in Examples 1 and 8-11, with powder loadings being 18, 26, 28 and 44 g/L respectively. Permeability of the calcined honeycombs with attached discriminating layer is measured by flowing air through the honeycomb and measuring back pressure using a Rosemount 3051 pressure transmitter. Air flow is stepped up in 10 L/min increments and held for 60 s before proceeding to the next step. Back pressure is measured at is intervals and the data is averaged at each flow rate. Permeabilities are as follows:
Example 11: $2.1 \times 10^{-12}$ k/(m$^2$)
Example 12: $1.5 \times 10^{-12}$ k/(m$^2$)
Example 13: $1.9 \times 10^{-12}$ k/(m$^2$)
Example 14: $0.7 \times 10^{-12}$ k/(m$^2$)
The permeability of the uncoated honeycomb is about $1.9 \times 10^{-12}$ k/(m$^2$).

EXAMPLE 15

A mixture of ceria and zirconia catalyst powder (Daricat CEZR 6201, from Darison Catalyst) is formed into 25-100 micron aggregates and deposited into an acicular mullite honeycomb in the general manner described in Example 1. The loading is 17 g/L. The loaded honeycomb is then heat treated at 700° C. to calcine the catalyst powder mixture. SEM images of the product show that the catalyst is deposited onto the surface of the gas entry side of the walls of the honeycomb or into pores immediately underneath the surface. Only a portion of the gas entry side of the walls is coated at this level of loading.

Pressure drop through the coated filter is measured as described in Example 1. It is only 11% higher than that of the uncoated honeycomb.

EXAMPLE 16

Example 15 is repeated, this time with a catalyst loading of 44 g/L of powder.

Pressure drop through the coated filter is measured as described in Example 1. It is only 11% higher than that of the uncoated honeycomb. After firing, SEM images show that the gas entry surfaces of the walls of the honeycomb are completely covered with a layer of the catalyst material. Pressure drop through this product is 81% higher than that of the starting honeycomb.

EXAMPLE 17

A ZSM-5 zeolite catalyst powder is formed into 25-100 micron aggregates and deposited into an acicular mullite honeycomb in the general manner described in Example 1. The loading is 22 g/L. The loaded honeycomb is then heat treated at 700° C. to calcine the catalyst powder mixture. SEM images of the product show that the catalyst is deposited onto essentially the entire surface of the gas entry side of the walls of the honeycomb.

Pressure drop through the coated filter is measured as described in Example 1. It is 44% higher than that of the uncoated honeycomb.

What is claimed is:

1. A method of forming a porous discriminating layer on a ceramic support having at least one porous wall comprising:
   (a) establishing a flow of a gas stream containing particle agglomerates through said at least one porous wall from a gas entry side of said at least one porous wall to a gas outlet side of said at least one porous wall, such that at least a portion of the agglomerates deposit to form a deposited layer of the agglomerates, their constituent particles or both on the gas entry side of said at least one porous wall, wherein:
      (1) at least a portion of the particles that make up the particle agglomerates are of a ceramic material or precursor to a ceramic material,
      (2) the particles that make up the particle agglomerates have a size from 0.01 to 5 microns (µm),
      (3) the particle agglomerates have a size of from 10 to 200 microns,
      (4) the particle agglomerates are electrostatically-agglomerated, agglomerated by spray-drying or agglomerated by calcining, and
      (5) said deposited layer extends only partially through a thickness of said at least one porous wall; and
   (b) calcining said deposited layer to form the discriminating layer.

2. The method of claim 1, wherein the particle agglomerates include particles of a mullite precursor and, during step (b), the mullite precursor particles form mullite.

3. The method of claim 2, wherein the support is acicular mullite.

4. The method of claim 1, wherein the particle agglomerates include particles of at least one functional material.

5. The method of claim 4, wherein the functional material is a catalyst or catalyst precursor.

6. The method of claim 1, wherein at least some of the agglomerates break apart upon depositing onto a support wall to partially or fully divide back to their constituent particles.

7. The method of claim 6, wherein the deposited layer is from 25 to 75 microns thick.

8. The method of claim 7, wherein the porous wall has a volume average pore diameter of from 15 to 35 microns.

9. The method of claim 8, wherein the porous wall has a porosity of at least 60%.

10. The method claim 9, wherein the porous discriminating layer has a pore size of from 0.1 to 3 microns.

11. The method of claim 10, wherein the porous discriminating layer has a porosity of from 40 to 90%.

12. The method of claim 1, further comprising depositing a functional material into the pores of said porous walls or onto the gas outlet side of the porous wall.

13. The method of claim 1, wherein step (a) is performed twice to deposit a deposited layer on both sides of the porous wall(s).

14. A method of repairing a defect in a ceramic support having at least one porous wall having pores and at least one defect resulting in an opening exhibiting a lower pressure drop in said porous wall than areas of the porous wall without a defect, said opening being large relative to the pores, comprising:
   (a) establishing a flow of a gas stream containing particle agglomerates through the support and through said defect in the porous wall where the pressure drop is lowest from a gas entry side of said porous wall to a gas outlet side of said at least one porous wall, such that the agglomerates, their constituent particles or both become lodged within said defect in said at least one porous wall to at least partially close the defect wherein:
(1) at least a portion of the particles that make up the agglomerates are of a ceramic material or a precursor to a ceramic material,
(2) the particles that make up the agglomerates have a size from 0.01 to 5 microns,
(3) the particle agglomerates are electrostatically-agglomerated, agglomerated by spray-drying or agglomerated by calcining, and
(4) the particle agglomerates have a size of from 10 to 200 microns, and
(b) calcining said lodged agglomerates or particles.

15. The method of claim 14, wherein the particle agglomerates include particles of a mullite precursor and, during step (b), the mullite precursor particles form mullite.

16. The method of claim 15, wherein the support is acicular mullite.

17. The method of any claim 14, wherein the particle agglomerates include particles of at least one functional material.

18. The method of claim 17, wherein the functional material is a catalyst or catalyst precursor.

* * * * *